(12) United States Patent
Wolfe et al.

(10) Patent No.: US 7,604,000 B2
(45) Date of Patent: Oct. 20, 2009

(54) TUNNEL OVEN

(75) Inventors: Gary L. Wolfe, Wichita, KS (US); Ronald D. Wolfe, Goddard, KS (US)

(73) Assignee: Wolfe Electric, Inc., Wichita, KS (US)

( * ) Notice: Subject to any disclaimer, the term of this patent is extended or adjusted under 35 U.S.C. 154(b) by 234 days.

(21) Appl. No.: 11/614,264

(22) Filed: Dec. 21, 2006

(65) Prior Publication Data
US 2008/0149087 A1 Jun. 26, 2008

(51) Int. Cl.
F24C 15/32 (2006.01)
A21B 1/26 (2006.01)

(52) U.S. Cl. ............... 126/21 A; 126/21 R; 126/41 B; 99/386

(58) Field of Classification Search ............... 126/21 A, 126/21 R; 219/388, 400; 432/152; 99/389, 99/401, 403, 443 C, 443 R, 477–479; 426/523; 454/188–193
See application file for complete search history.

(56) References Cited

U.S. PATENT DOCUMENTS

| | | | |
|---|---|---|---|
| 2,220,718 A | 11/1940 | Holm | |
| 2,249,152 A | 7/1941 | Marshall | |
| 2,256,003 A | 9/1941 | Patterson | |
| 2,286,049 A * | 6/1942 | Baker | 432/152 |
| 2,634,693 A | 4/1953 | Pointon | |
| 3,239,651 A | 3/1966 | Silberman | |
| 3,319,557 A * | 5/1967 | Perez | 454/193 |
| 3,485,229 A | 12/1969 | Gilliom | |
| 3,526,752 A | 9/1970 | Bell | |
| 4,016,809 A * | 4/1977 | Austin | 454/60 |
| 4,038,968 A * | 8/1977 | Rovell | 126/261 |
| 4,298,341 A * | 11/1981 | Nowack | 432/64 |
| 4,377,109 A * | 3/1983 | Brown et al. | 99/401 |
| 4,471,000 A | 9/1984 | Brown et al. | |

(Continued)

FOREIGN PATENT DOCUMENTS
WO WO 89/00393 1/1989

Primary Examiner—Kenneth B Rinehart
Assistant Examiner—Frances Kamps
(74) Attorney, Agent, or Firm—Kenneth H. Jack; Davis & Jack, L.L.C.

(57) ABSTRACT

A tunnel oven including a case enclosing a baking chamber, the baking chamber having a lateral side, an oppositely lateral side, a longitudinal end, and an oppositely longitudinal end, the case having longitudinal and oppositely longitudinal end walls respectively bounding the baking chamber's longitudinal and oppositely longitudinal ends; the tunnel oven further including first and second food passage ports respectively extending through the case's longitudinal and oppositely longitudinal end walls, the first food passage port having lateral and oppositely lateral sides; the tunnel oven further including a heater connected operatively to the case; the tunnel oven further including a food conveyor extending longitudinally through the baking chamber; the tunnel oven further including a plenum mounted within the baking chamber's lateral side, the plenum being opened by a blower port and by at least a first duct port; the tunnel oven further including an air blower mounted in communication with the plenum's blower port; the tunnel oven further including at least a first air duct mounted in communication with the at least first duct port; and the tunnel oven further including at least a first air curtain port further opening the plenum, the at least first air curtain port being positioned for directing air toward the first food passage port's lateral side.

11 Claims, 5 Drawing Sheets

U.S. PATENT DOCUMENTS

| | | | | |
|---|---|---|---|---|
| 4,753,215 A | * | 6/1988 | Kaminski et al. | 126/21 A |
| 4,831,238 A | * | 5/1989 | Smith et al. | 219/400 |
| 4,834,063 A | * | 5/1989 | Hwang et al. | 126/21 A |
| 4,940,040 A | * | 7/1990 | Randall et al. | 126/21 A |
| 4,960,100 A | * | 10/1990 | Pellicane | 126/21 A |
| 5,025,775 A | * | 6/1991 | Crisp | 126/21 A |
| 5,131,841 A | * | 7/1992 | Smith et al. | 432/59 |
| 5,180,898 A | * | 1/1993 | Alden et al. | 219/388 |
| 5,205,274 A | | 4/1993 | Smith et al. | |
| 5,285,771 A | * | 2/1994 | Griffes | 126/299 D |
| 5,532,456 A | * | 7/1996 | Smith et al. | 219/400 |
| 5,673,681 A | * | 10/1997 | Neitzel et al. | 126/299 R |
| 5,942,142 A | | 8/1999 | Forney et al. | |
| 5,944,515 A | | 8/1999 | Gilmore et al. | |
| 6,121,582 A | | 9/2000 | Dollinger et al. | |
| 6,192,877 B1 | * | 2/2001 | Moshonas et al. | 126/21 A |
| 6,251,006 B1 | * | 6/2001 | Laborde et al. | 454/190 |
| 6,320,165 B1 | | 11/2001 | Ovadia | |
| 6,576,874 B2 | | 6/2003 | Zapata et al. | |
| 6,686,566 B1 | | 2/2004 | Corey | |
| 7,098,432 B2 | * | 8/2006 | Rew et al. | 219/757 |
| 7,220,946 B2 | * | 5/2007 | Majchrzak et al. | 219/401 |
| 7,340,992 B1 | * | 3/2008 | Wolfe et al. | 99/386 |
| 2008/0149087 A1 | * | 6/2008 | Wolfe | 126/21 A |

* cited by examiner

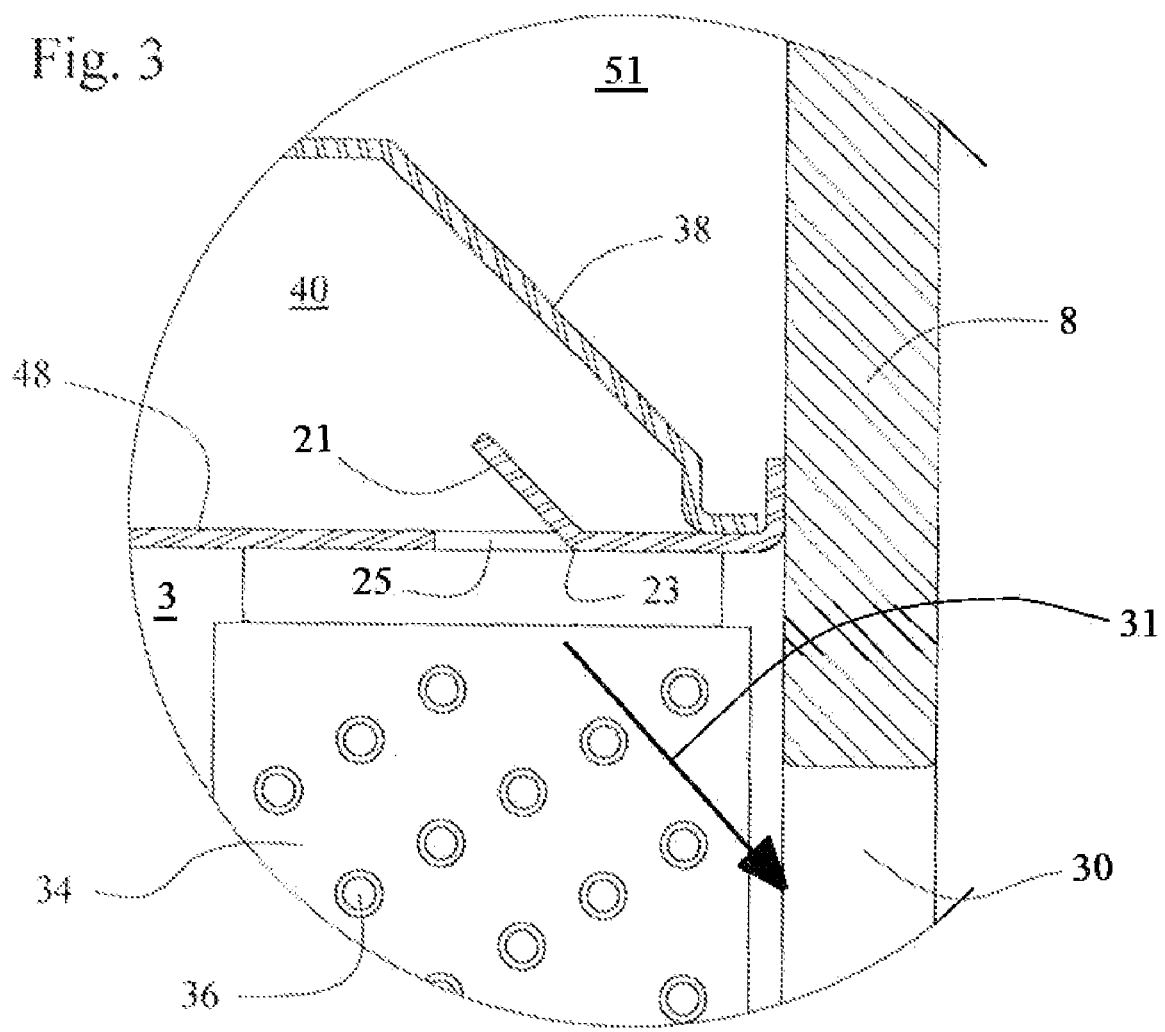

TUNNEL OVEN

FIELD OF THE INVENTION

This invention relates to tunnel ovens. More particularly, this invention relates to tunnel ovens which incorporate a longitudinally extending food conveyor, and further incorporate within the oven's baking case air blowing means and duct work for air impingement baking of the conveyed food items.

BACKGROUND OF THE INVENTION

The physical geometry and dimensions of tunnel ovens which are adapted for air impingement food baking place restrictions upon acceptable locations within such ovens where their air blowers and air distributing plenums may be installed. Such ovens typically include a longitudinally extending food conveyor which passes through ports within the longitudinal end walls of the oven's baking case. Accordingly, the longitudinal ends of such ovens typically cannot serve as a mounting site for the oven's blower and air plenum. Space considerations further restrict blower and plenum mounting sites. Such tunnel ovens are typically compactly stacked, one over the other, in pairs or triples. In order to make such stacked tunnel ovens useable by average height persons, such ovens are designed to have a low vertical profile. The need for minimizing the vertical dimension of such ovens eliminates the spaces within such ovens which overlie and underlie the food conveyor as an acceptable location for installation of the oven's blower and air plenum.

The two remaining sites within such tunnel ovens which are candidates for installation of the plenum and blower are the oven's left and right or lateral and oppositely lateral sides. Typically, such oven's oppositely lateral side is configured as a removable access panel or door, making such side unsuitable for blower and plenum installation.

By the process of elimination, the sole remaining location within such tunnel ovens for air blower and plenum mounting is the oven's lateral side. While placement of a tunnel oven's air blower and plenum at its lateral side advantageously solves several design challenges (as described above), such lateral positioning creates other difficulties. For example, it is desirable that a tunnel oven provide a balanced flow of food impinging air across the lateral width of the oven's conveyor. Yet, placement of the oven's air blower and plenum at the oven's lateral side requires that air propelled by the blower be initially directed toward the oven's oppositely lateral side. Such oppositely lateral direction of impingement air creates a relatively high air pressure zone at the oppositely lateral side of the oven's baking chamber, and creates a corresponding relatively low air pressure zone at the oven chamber's lateral side.

In order to counteract such lateral air pressure imbalances, within a tunnel oven's baking chamber, duct work extending within the chamber (commonly configured as a longitudinally arrayed series of oppositely laterally extending air duct "fingers") is commonly volumetrically tapered, such air ducts having their larger volume at their lateral ends, and having their smaller volume end at their oppositely lateral ends. However, air flow modifications to such duct work commonly fails to achieve true air pressure equilibrium across the lateral width of the oven's baking chamber. Finger ducts which are modified to sufficiently evenly dispense air across the lateral width of the oven's conveyor often undesirably leave a residual air pressure imbalance between the lateral and oppositely lateral sides of the baking chamber.

Such residual air pressure imbalances tend to create undesirable air flow patterns at the oven's food passage ports which open the oven's longitudinal and oppositely longitudinal ends. Typically, such food passage ports are oblongated, the orientation of their long axes matching the general lateral progression of the gradient of the above described undesirable residual air pressure imbalance. Accordingly, just as the above described typical tunnel oven produces a residual air pressure imbalance between the lateral and oppositely lateral sides of its baking chamber, air pressure imbalances tend to exist between the lateral and oppositely laterally ends of the oven's oblongated food passage ports. Such air pressure imbalances at such ports create counter-rotating air vortices at the food passage ports, such vortices undesirably expelling hot cooking air at the oppositely lateral ends of the food passage ports, and commensurately undesirably aspirating room temperature air at the lateral ends of the food passage ports. Circulation of such air vortices markedly reduces both the cooking efficiency and energy efficiency of the tunnel oven.

The instant invention solves or ameliorates defects, drawbacks, and deficiencies discussed above by providing a tunnel oven which incorporates means for creating a vortex disrupting opposing "air curtain" at the lateral ends of the oven's food passage ports.

BRIEF SUMMARY OF THE INVENTION

A first structural component of the instant inventive tunnel oven comprises a case which encloses and defines a baking chamber. The case component of the inventive oven preferably comprises a floor, a ceiling, a lateral side wall, an oppositely lateral side wall, a longitudinal end wall, and an oppositely longitudinal end wall. The floor, ceiling, and four walls of the case are preferably configured orthogonally with respect to each other to define the baking chamber which has a lateral side, an oppositely lateral side, a longitudinal end, and a oppositely longitudinal end. Preferably, the floor, ceiling, and walls of the case comprise stainless steel clad heat resistant insulating material.

Further structural components of the instant inventive tunnel oven preferably comprise first and second, or longitudinal and oppositely longitudinal, food passage ports, such ports respectively extending through the case's longitudinal and oppositely longitudinal end walls. Each of the food passage ports preferably is laterally oblongated, each defining an opening having a lateral end and having an oppositely lateral end, such ends corresponding with the lateral and oppositely lateral sides of the baking chamber.

A further structural component of the instant inventive tunnel oven comprises a heater which is connected operatively to the case for heating air within the baking chamber to cooking temperatures typically between 300° F. and 550° F. Preferably, the heater comprises a natural gas burner. Suitably, the heater may alternately comprise electric resistance heating elements.

A further structural component of the instant inventive tunnel oven preferably comprises a food conveyor which extends longitudinally through the baking chamber from the first food passage port to the second food passage port. Preferably, the food conveyor comprises a continuous loop cooking rack or grate, and such conveyor is preferably mounted over a drive roller at the conveyor's longitudinal end and over an idler roller at the conveyor's oppositely longitudinal end. The drive roller is preferably driven by a variable speed electric motor. In the preferred embodiment of the instant invention, the conveyor preferably further extends longitudinally outwardly from the first food passage port and extends oppositely longitudinally outwardly from the second food passage port, such additional conveyor extensions assisting in imputing items such as uncooked pizzas into the oven and assisting retrieval of such cooked items from the output end of the oven.

A further structural component of the instant inventive tunnel oven comprises an air plenum which is preferably mounted within the oven's baking chamber and is positioned at the baking chamber's lateral side. Preferably, the plenum comprises a sheet steel box having a lateral wall opened by a blower port and having an oppositely lateral wall which is preferably opened by at least a first duct port. In the preferred embodiment, the plenum is longitudinally oblongated, having dimensions which allow the plenum to be mechanically suspended by welded mounting flanges within the lateral side of the baking chamber, while leaving return air passage gaps between the upper and lower surfaces of the plenum and the inner surfaces of the ceiling and floor of the tunnel oven. In the preferred embodiment, the plenum's blower port is positioned at and extends through the plenum's lateral wall.

A further structural component of the instant inventive tunnel oven comprises an air blower which is preferably mounted in operative communication with the plenum's blower port for drawing heated air from the baking chamber and for driving such air into the hollow interior of the plenum. In the preferred embodiment of the instant invention, the air blower comprises an electric motor driven fan having multiple radially extending vanes or blades. Such fan preferably concentrically overlies the opening of the blower port while the blower motor is fixedly and rigidly mounted upon the case's lateral side wall. Suitably, the fan component of the air blower may alternately comprise a scirocco or "squirrel cage" fan encased within a housing, the housing defining an output port whose output end is mounted in communication with the plenum's blower port.

A further structural component of the instant inventive tunnel oven comprises at least a first air duct mounted in communication with the plenum's at least first duct port. In the preferred embodiment, the lateral wall of the plenum is further opened by a plurality of second duct ports, and in such embodiment a plurality of second air ducts are also provided, each second air duct being mounted in communication with one of the second duct ports. Each of the air ducts is preferably configured as a hollow air channeling "finger", and such ducts are preferably grouped into upper and lower pluralities or air ducts or finger ducts, the upper plurality overlying the food conveyor, and the lower plurality underlying the food conveyor. Preferably, each of the air ducts cantilevers laterally oppositely across the lateral width of the conveyor, and each preferably includes an air register. The air registers of the finger ducts among the upper plurality of finger ducts preferably open downwardly, and the lower finger ducts' registers preferably open upwardly. Air driven by the air blower into the plenum generally emits from the plenum through the plenum's first and plurality of second duct ports, and thence into the upper and lower pluralities finger ducts for respective downward and upward emission toward food items such as pizzas which may be carried by the food conveyor. Heated air which impinges upon upper and lower surfaces of such conveyed food items beneficially shortens baking times.

A further structural component of the instant inventive tunnel oven comprises at least a first air curtain port, and preferably comprises a pair of air curtain ports. Each of the air curtain ports preferably extends through the oppositely lateral wall of the plenum, and such ports are preferably positioned thereon near its longitudinal and oppositely longitudinal ends so that air emitting from such ports is directed toward the lateral ends of the openings of the longitudinal and oppositely longitudinal food passage ports. Such port directed air advantageously forms longitudinal and oppositely longitudinal "air curtains" at the lateral ends of the food passage ports. The air curtains beneficially oppose or interfere with air vortices which may otherwise undesirably develop at the food passage ports. The interference with such vortices advantageously minimizes emission of heated cooking air at the oppositely lateral ends of the food passage ports, and correspondingly minimizes undesirable aspiration of room temperature air at the lateral ends of such ports.

Accordingly, objects of the instant invention include the provision of a food conveying air impingement tunnel oven having an air plenum configured to include air curtain ports. Other and further objects, benefits, and advantages of the instant invention have been discussed above and will become apparent to those skilled in the art upon review of the Detailed Description which follows, and upon review of the appended drawings.

BRIEF DESCRIPTION OF THE DRAWINGS

FIG. 3 is a magnified view of a portion of the structure depicted in FIG. 2.

DETAILED DESCRIPTION OF A PREFERRED EMBODIMENT

Figure 1:
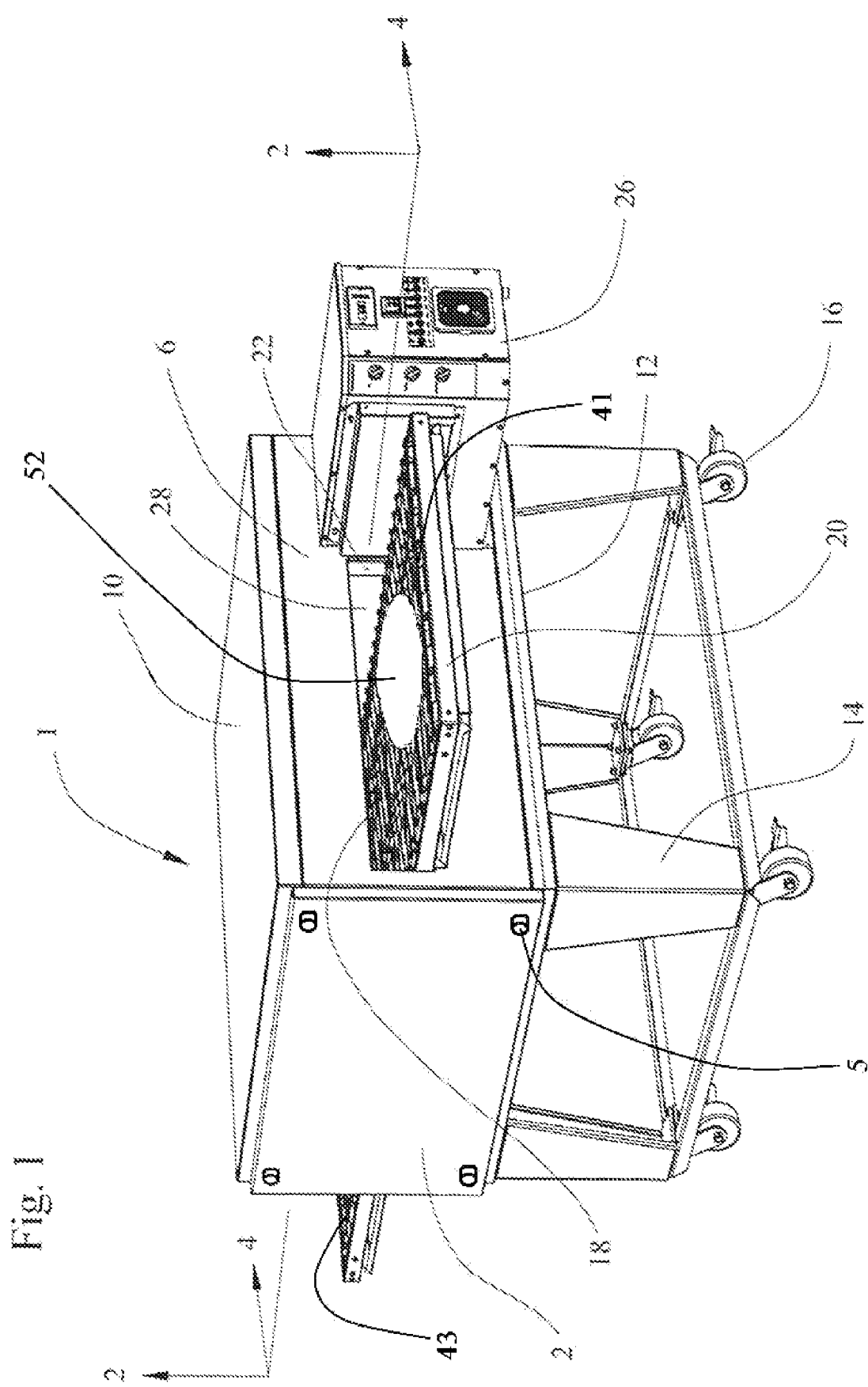
FIG. 1 is an isometric view of the instant inventive tunnel oven.
Figure 2:
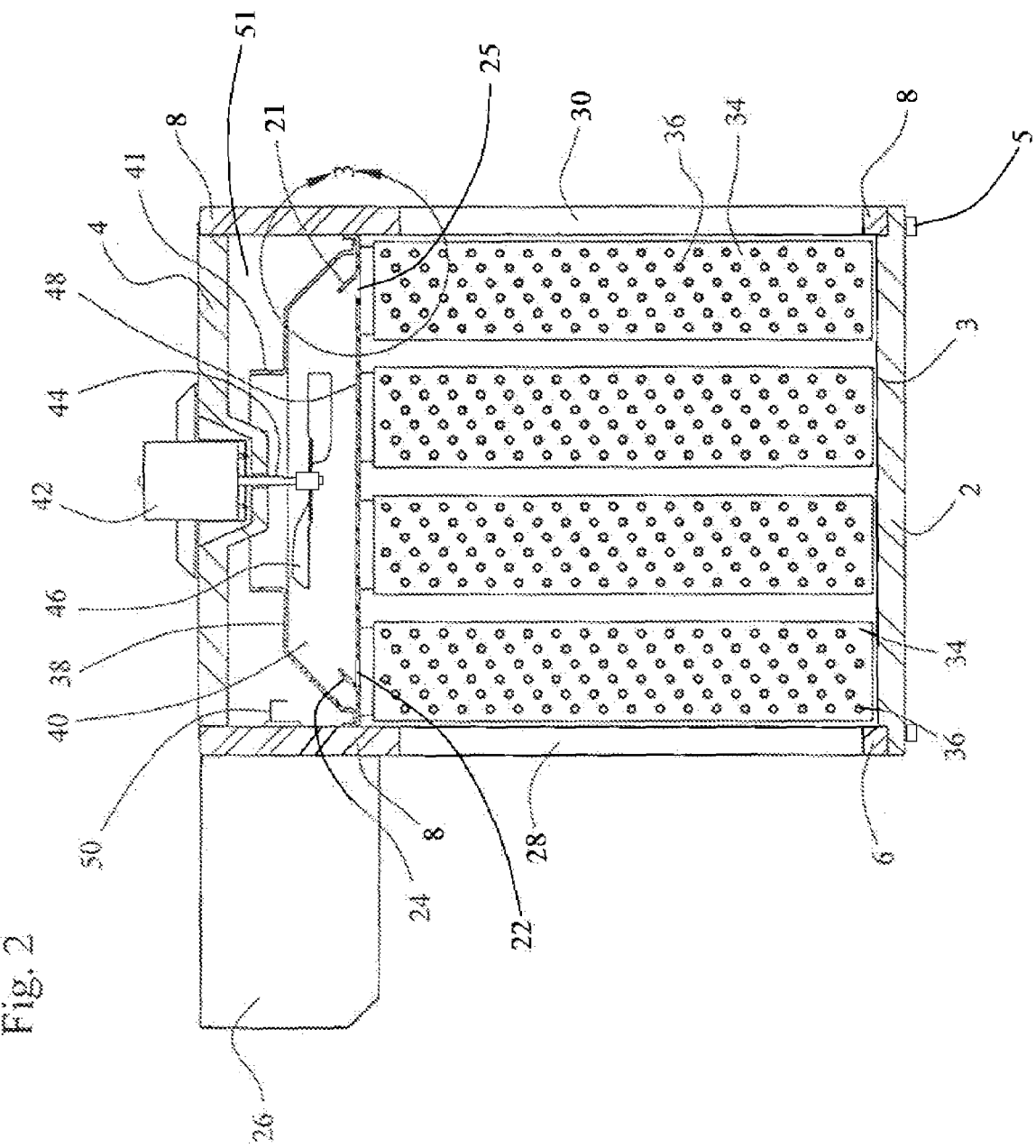
FIG. 2 is a sectional view of the oven of FIG. 1, as indicated in FIG. 1.

Referring now to the drawings, and in particular to FIG. 1, a preferred embodiment of the instant inventive tunnel oven is referred to generally by Reference Arrow 1. The tunnel oven 1 comprises a baking case which includes an upper ceiling 10, and includes a lower floor 12. Referring further simultaneously to FIG. 2, the baking case of the oven 1 further includes a longitudinal end wall 6 and an oppositely longitudinal end wall 8. The baking case further includes a lateral side wall 4 and an oppositely lateral side wall 2. The ceiling 10, the floor 12, the longitudinal and oppositely longitudinal end walls 6 and 8, and the lateral and oppositely lateral side walls 4 and 2 preferably comprise stainless steel clad insulating material. Such case elements substantially enclose and define an interior baking chamber 3 where food items such as uncooked pizzas 52 may be baked. Preferably, the laterally opposite wall 2 is configured as an access panel which is removably attached to the oppositely lateral side of the tunnel oven 1 by means of screws 5. The tunnel oven depicted in FIG. 1 is supported by legs 14 and is made easily movable by rolling casters 16. The upper surface of the ceiling 10 may advantageously be utilized as a support or mounting surface for a second stacked rendition of the tunnel oven 1, such second rendition being identical to the oven 1, yet omitting legs and casters.

Referring simultaneously to FIGS. 1 and 2, the longitudinal and oppositely longitudinal end walls 6 and 8 preferably respectively include food passage ports 28 and 30, each being laterally oblongated to define openings having lateral ends oriented toward the oven's lateral wall 4, and having oppositely lateral ends oriented toward the oven's oppositely lateral wall 2.

Referring further simultaneously to FIGS. 1 and 2, a rigid rectangular conveyor support frame 20 preferably extends longitudinally through the baking chamber 3, the longitudinal end of the rigid frame 20 extending longitudinally outwardly from food passage port 28, and the oppositely longitudinal end of the frame 20 extending oppositely longitudinally from food passage port 30. The rigid frame 20 supports a continuous loop food conveying grate 18 which extends over a drive roller 41 which is rotatably mounted across the longitudinal end of the rigid frame 20, and which further extends over an idler roller 43 which is similarly rotatably mounted across the oppositely longitudinal end of the rigid frame 20. An electric motor (not within view) housed within control case 26 drives the drive roller 41 for imparting continuous longitudinal motion to the continuous loop grate 18. The control case 26 preferably additionally houses a natural gas burner assembly (not within view), such burner having a burner outlet 50 which heats to cooking temperatures air within the baking chamber 3.

Referring to FIG. 2, an electric blower motor 42 is preferably rigidly mounted upon the oven's lateral wall 4, such motor having an oppositely laterally extending drive output shaft 44 which passes through a closely fitted aperture within the lateral wall 4. The blower assembly further comprises an air driving fan or impeller 46 is fixedly mounted to the oppositely lateral end of the drive shaft 44.

Referring further to FIG. 2, an air plenum having a lateral wall 38 and having an oppositely lateral wall 48 is preferably rigidly mounted within the lateral side or end of the baking chamber 3. Preferably, the lateral wall 38 of such air plenum is opened by a circular and circumferentially flanged blower port 41, such port 41 and the fan 46 being positioned in relation to each other so that air within the baking chamber 3 may be drawn by the fan 46 oppositely laterally through the blow port 41 to enter the hollow interior 40 of the plenum. As can be seen in FIG. 2, the oppositely lateral wall 48 of the plenum extends completely longitudinally from the oven's longitudinal end wall 6 to the oven's oppositely longitudinal end wall 8. However, referring further simultaneously to FIG. 4, the air plenum does not extend completely vertically within the baking chamber 3, the plenum advantageously leaving air return ports or slots 49 above and below the plenum.

Figure 4:
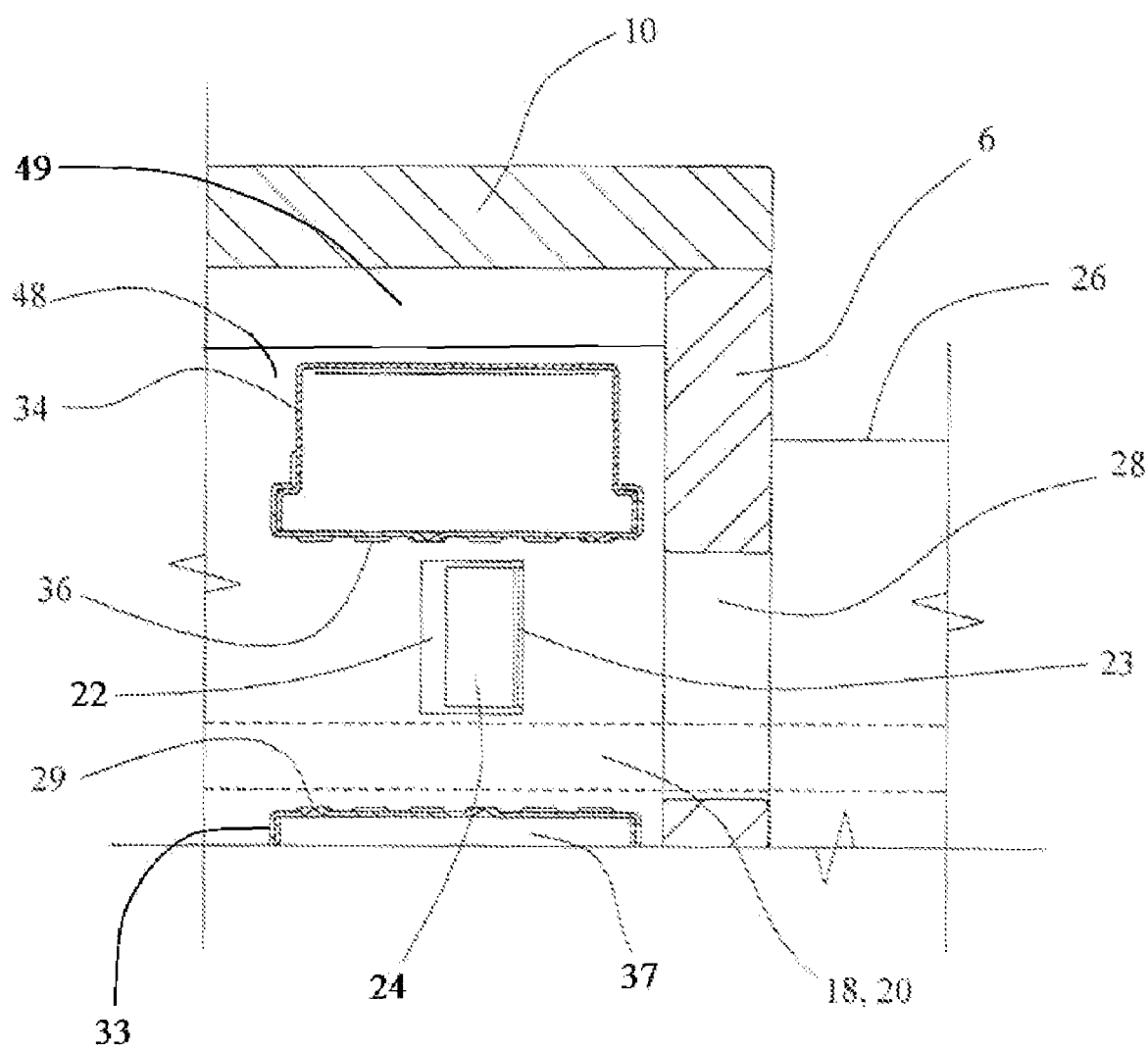
FIG. 4 is an alternately oriented sectional view of a portion of the structure depicted in FIG. 1, as indicated in FIG. 1.

Referring simultaneously to FIGS. 2 and 4, the air plenum is preferably further opened by at least a first, and preferably a plurality of duct ports or openings 35 and 37, such duct ports 35 and 37 extending through the plenum's oppositely lateral wall 48. Preferably, duct port 35 represents a longitudinally extending series of overlying duct ports while duct port 37 represents a mirroring underlying series of duct ports, such overlying and underlying series respectively having elevations greater than and less than that of the conveyor and frame assembly 18 and 20.

Referring further simultaneously to FIGS. 2 and 4, oppositely laterally extending "finger" air ducts 34 are preferably rigidly mounted to the oppositely lateral wall 48 of the air plenum and in communication with the duct ports 35. A mirroring series of oppositely laterally extending "finger" air ducts 33 is similarly rigidly mounted to wall 48 in communication with duct ports 37. The upper finger ducts 34 include a lower register having a multiplicity of downwardly opening air jets 36, and the lower finger ducts 33 similarly have upper registers which have multiplicities of upwardly opening air jets 29.

Referring simultaneously to FIGS. 1, 2, and 4, as a food item such as the uncooked pizza 52 is conveyed by the continuous loop cooking grate 18 through the first or longitudinal food passage port 28, and thence through the interior baking chamber 3, air heated by the air heater 50 is drawn or driven by the motor 42 and fan 46 blower assembly from the interior cooking space of the cooking chamber 3 laterally toward air passage ports or slots 49 above and below the plenum. The air is then drawn into interior space 51 at the lateral end of the cooking chamber 3. Such air is then further drawn or driven oppositely laterally through blower port 41 to enter the interior space 40 of the plenum. Such air is then further driven oppositely laterally through the duct ports 35 and 37 within the oppositely lateral wall 48 of the plenum to enter the hollow interiors of the upper and lower finger ducts 34 and 33. Air driven within such ducts then emits as impingement air jets downwardly and upwardly through jet ports 36 and 29. As the pizza 52 travels oppositely longitudinally through the baking chamber 3 and between the upper and lower series of finger ducts 34 and 33, such downwardly and upwardly directed air jets impinge upon such pizza 52, advantageously shortening the cooking time of such pizza.

Figure 2A:
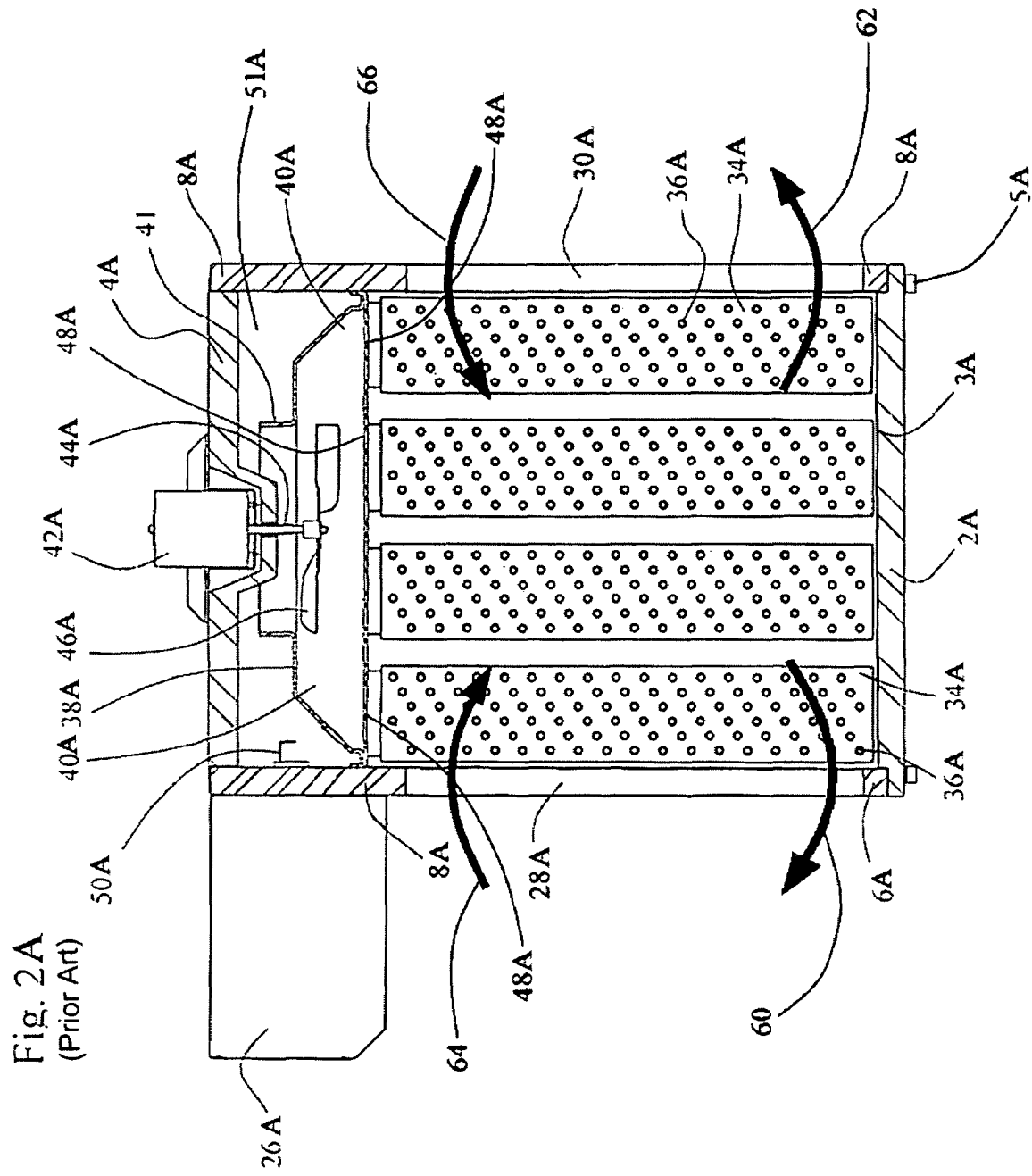
FIG. 2A is a similarly oriented sectional view of a prior art tunnel oven.

Referring further simultaneously to FIG. 2A, the prior art tunnel oven which is therein sectionally viewed is in several respects structurally identical to the tunnel oven of FIG. 2, a structural difference being that in the prior art tunnel oven of FIG. 2A, the oppositely lateral wall 48A of the plenum is opened or apertured only by the duct ports which communicate with the finger ducts. Accordingly, similar structures appearing in FIGS. 2 and 2A are similarly numbered. Referring in particular to FIG. 2A, as heated cooking air is driven oppositely laterally through the finger ducts 34A, such air tends to compressively accumulate at the distal or oppositely lateral ends of such ducts, causing the air to emit more forcefully from the air jets 36A which are situated at the ducts' oppositely lateral ends. Such pressure and air emission imbalances within the finger ducts 34A tends to cause air pressure at the oppositely lateral end of the baking chamber 3A to be slightly greater than that at such chamber's lateral end. The baking case's pressure imbalance undesirably causes heated cooking air to emit from the oppositely lateral ends of the food passage ports 28A and 30A. Such undesirable emission of heated cooking air is designated by curved arrows 60 and 62. Such outward emissions of heated cooking air 60 and 62 is typically undesirably balanced in the manner of circulating air vortices by inward flows of air which are represented by curved arrows 64 and 66. The circulating flows and interchange of heated cooking air and unheated room temperature air represented by arrows 60, 62, 64, and 66 undesirably diminishes the cooking and energy efficiency of the prior art tunnel oven represented by FIG. 2A.

Referring simultaneously to all figures, in order to counteract such undesirable air flows as represented by arrows 60, 62, 64, and 66 in FIG. 2A, the instant inventive tunnel oven 1 further opens the oppositely lateral wall 48 with at least a first air curtain port or aperture 22 and preferably a pair of air curtain ports 22 and 25. Referring in particular to FIG. 3, air curtain port 25 is preferably positioned upon the plenum's oppositely lateral wall 48 so that a portion of the air passing oppositely laterally therethrough from the plenum's interior 40 and into the cooking chamber 3 is directed toward the lateral end of the food passage port 30 to function as an "air curtain". Such air curtain is designated by arrow 31. The air curtain 31 advantageously opposes or counters the room temperature air aspirating flow 66 which would otherwise exist as depicted in FIG. 2A. Such curtain's interruption of flow 66 advantageously disrupts air circulation at the food passage port 30/30A, and advantageously minimizes emission of heated cooking air 62 at the laterally opposite end of the food passage port 30. The air curtain port 22 is preferably mirroringly situated near the longitudinal end of the plenum's oppositely lateral wall 48 to create a similarly beneficial air curtain at the lateral end of food passage port 28.

Referring to FIGS. 2, 3, and 4, air directing vanes 21 and 24 are preferably provided in conjunction with mounting means, the mounting means interconnecting the air directing vanes 21 and 24 with the oppositely lateral wall 48 of the plenum. In the preferred embodiment, such mounting means comprises ductally deformable living hinges 23.

Referring simultaneously to FIGS. 2, 3, and 4, each of the air curtain ports 22 and 25 preferably is configured in the form of a "C" slot, as is best graphically depicted in FIG. 4. As is shown in FIG. 4, the ductally deformable living hinges 34 extend vertically between the distal ends of the upper and lower arms of such "C" slots. In operation, the angular orientations of the vanes 21 and 24 with respect to their "C" slot configured air curtain ports 25 and 22 may be variably adjusted via manual bending at the ductally deformable living hinges 23. Such bending adjustments of vanes 21 and 24 may advantageously adjust the air curtain strength by altering the amount and direction of air flows 31 at the lateral ends of the food passage ports 30 and 28.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. A tunnel oven comprising:
   (a) a case enclosing a baking chamber, the baking chamber having a lateral side, an oppositely lateral side, a longitudinal end, and an oppositely longitudinal end, the case comprising longitudinal and oppositely longitudinal end walls respectively bounding the baking chamber's longitudinal and oppositely longitudinal ends;
   (b) first and second food passage ports respectively extending through the case's longitudinal and oppositely longitudinal end walls, the first food passage port having an upper end and lateral and oppositely lateral sides;
   (c) a heater connected operatively to the case;
   (d) a food conveyor extending longitudinally through the baking chamber;
   (e) a plenum mounted within the baking chamber's lateral side, the plenum being opened by a blower port and by at least a first duct port;
   (f) an air blower mounted in communication with the plenum's blower port;
   (g) at least a first air duct mounted in communication with the at least first duct port; and
   (h) at least a first air curtain port further opening the plenum, the at least first air curtain port being positioned for directing air toward the first food passage port's lateral side, the at least first air curtain port being further positioned at an elevation below that of the first food passage port's upper end.

2. The tunnel oven of claim 1 further comprising a first vane, and first mounting means interconnecting the first vane and the plenum, the first mounting means positioning the first vane for further directing the air toward the first food passage port's lateral side.

3. The tunnel oven of claim 2 wherein the first mounting means comprises a first hinge.

4. The tunnel oven of claim 3 wherein the first hinge comprises a first ductally deformable living hinge.

5. The tunnel oven of claim 4 wherein the second food passage port has lateral and oppositely lateral sides, and further comprising a second air curtain port further opening the plenum, the second air curtain port being positioned for directing air toward the second food passage port's lateral side.

6. The tunnel oven of claim 5 further comprising a second vane and second mounting means interconnecting the second vane and the plenum, the second mounting means positioning the second vane for further directing air toward the second food passage port's lateral side.

7. The tunnel oven of claim 6 wherein the second mounting means comprises a second hinge.

8. The tunnel oven of claim 7 wherein the second hinges comprise a second ductally deformable living hinge.

9. The tunnel oven of claim 8 wherein the at least first air duct extends oppositely laterally, wherein the plenum is further opened by a plurality of second duct ports, and further comprising a plurality of second oppositely laterally extending air ducts, each second oppositely laterally extending air duct being mounted in communication with one of the ducts among the plurality of second air ducts.

10. The tunnel oven of claim 9 wherein the ducts among the at least first and plurality of second air ducts comprise upper and lower pluralities of air ducts, the upper and lower pluralities of air ducts respectively overlying and underlying the food conveyor.

11. The tunnel oven of claim 8 wherein the plenum has an oppositely lateral wall, the oppositely lateral wall having first and second "C" slots extending therethrough, each "C" slot having upper and lower arms, each such arm having a distal end, the first and second ductally deformable living hinges respectively extending between the distal ends of the first and second "C" slots' arms.

\* \* \* \* \*